(12) United States Patent
Panciroli

(10) Patent No.: US 8,091,358 B2
(45) Date of Patent: *Jan. 10, 2012

(54) CONTROL METHOD FOR A TURBOCHARGER SUPERCHARGED INTERNAL COMBUSTION ENGINE

(75) Inventor: Marco Panciroli, Bologna (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 760 days.

This patent is subject to a terminal disclaimer.

(21) Appl. No.: 12/170,094

(22) Filed: Jul. 9, 2008

(65) Prior Publication Data

US 2009/0013688 A1  Jan. 15, 2009

(30) Foreign Application Priority Data

Jul. 9, 2007  (EP) .................................. 07425426

(51) Int. Cl.
*F02D 23/00* (2006.01)
(52) U.S. Cl. ......................................................... 60/602
(58) Field of Classification Search .................. 60/602
See application file for complete search history.

(56) References Cited

U.S. PATENT DOCUMENTS

| | | | | |
|---|---|---|---|---|
| 4,394,812 A * | 7/1983 | Mezger | ............................ | 60/600 |
| 4,793,140 A * | 12/1988 | Esch | ............................... | 60/600 |
| 5,289,683 A * | 3/1994 | Kurihara | ........................... | 60/602 |
| 5,363,652 A * | 11/1994 | Tanaka et al. | .................... | 60/603 |
| 5,526,645 A * | 6/1996 | Kaiser | ............................... | 60/611 |
| 5,755,101 A * | 5/1998 | Free et al. | ........................ | 60/602 |
| 5,829,254 A * | 11/1998 | Hayashi et al. | .................. | 60/602 |
| 6,155,050 A * | 12/2000 | Blanz et al. | ...................... | 60/603 |
| 6,279,551 B1 * | 8/2001 | Iwano et al. | ..................... | 123/564 |
| 6,457,312 B2 * | 10/2002 | Fahringer et al. | ................ | 60/611 |
| 6,467,270 B2 * | 10/2002 | Mulloy et al. | ............... | 60/605.2 |
| 6,564,554 B2 * | 5/2003 | Hercey et al. | .................... | 60/602 |
| 6,619,261 B1 * | 9/2003 | Wang et al. | ..................... | 123/435 |
| 6,751,956 B2 * | 6/2004 | Mayer et al. | ..................... | 60/602 |
| 6,779,344 B2 * | 8/2004 | Hartman et al. | ................ | 60/600 |
| 7,509,803 B2 * | 3/2009 | Panciroli | ........................... | 60/600 |
| 7,541,687 B2 * | 6/2009 | Stahlhut et al. | .................. | 290/52 |
| 7,650,218 B2 * | 1/2010 | Andreae et al. | ............... | 701/101 |

FOREIGN PATENT DOCUMENTS

| | | |
|---|---|---|
| DE | 197 12 850 | 10/1998 |
| DE | 103 17 959 | 11/2004 |
| EP | 1 031 722 | 8/2000 |
| EP | 1 741 895 | 1/2007 |

* cited by examiner

*Primary Examiner* — Thomas Denion
*Assistant Examiner* — Cameron Setayesh
(74) *Attorney, Agent, or Firm* — Ladas & Parry LLP

(57) ABSTRACT

A control method for an internal combustion engine supercharged by means of a turbocharger provided with a turbine and with a compressor; the control method contemplates the steps of: establishing at least one operating limit curve on a Reduced Mass Flow Rate/Compression Ratio map; establishing at least one intervention curve of a wastegate valve which adjusts a bypass pipe of the turbine on a Reduced Mass Flow Rate/Compression Ratio map; establishing at least one intervention curve of a Poff valve which adjusts a bypass pipe of the compressor on a Reduced Mass Flow Rate/Compression Ratio map; using the operating limit curve to limit the pressure target downstream of the compressor used by the engine control; controlling the opening of the wastegate valve if the intervention curve of the wastegate valve is exceeded; and controlling the opening of the Poff valve if the intervention curve of the Poff valve is exceeded.

13 Claims, 3 Drawing Sheets

CONTROL METHOD FOR A TURBOCHARGER SUPERCHARGED INTERNAL COMBUSTION ENGINE

TECHNICAL FIELD

The present invention relates to a control method for a turbocharger supercharged internal combustion engine.

BACKGROUND ART

As it is known, some internal combustion engines are provided with a turbocharger supercharging system, which is capable of increasing the power developed by the engine by exploiting the enthalpy of the exhaust gases for compressing the air taken in by the engine and thus increasing the volumetric intake efficiency.

A turbocharger supercharging system comprises a turbocharger provided with a turbine, which is arranged along an exhaust pipe to rotate at a high speed under the pressure of the exhaust gases expelled by the engine, and with a compressor, which is made to rotate by the turbine and is arranged along the air feeding pipe to compress the air taken in by the engine.

In a turbocharger supercharging system the operating field of the turbocharger must be kept within a useful zone depending on the crank position both for functional reasons (i.e. to avoid irregular or in any case low efficiency operation) and for structural reasons (i.e. to avoid damage to the turbocharger). Specifically, on the left side of the Reduced Mass Flow Rate/Compression Ratio map there is a "forbidden" zone delimited by the surge line, constituted by the set of points in which the aerodynamic equilibrium inside the compressor is interrupted and a periodic, noisy and violent rejection of flow rate to the mouth occurs, with effects which may be destructive for the blading; instead, on the right side of the Reduced Mass Flow Rate/Compression Ratio map there is a second "forbidden" zone delimited by the so-called "stalling line", which corresponds to the reaching of chocking conditions (and consequent flow rate stoppage) at the turbine inlet and defines the maximum possible flow rate that the compressor may supply in the given intake environment conditions.

Patent application EP1741895A1 discloses a control method for a turbocharger supercharged internal combustion engine comprising a compressor, a turbine adapted to rotably feed the compressor under the pressure of the engine exhaust gases, and a wastegate valve adapted to adjust the flow rate of exhaust gases input to the turbine for controlling the rotation speed of the turbine itself according to a supercharging pressure target required at the compressor outlet. The control method disclosed in patent application EP1741895A1 comprises the steps of measuring the air pressure taken in at the compressor inlet; determining the mass flow rate of the compressor; calculating a supercharging limit pressure, which is correlated to the pressure of the air obtainable at the compressor outlet when the turbine rotates at a speed essentially equal to the predetermined limit speed by means of a predetermined map which characterizes the operation of the compressor, and according to the predetermined rotation limit speed, the measured air pressure and the mass flow rate; verifying whether a required supercharging pressure target satisfies a predetermined relation with the calculated supercharging limit pressure; if the relation is satisfied, actuating the wastegate valve for controlling the rotation speed of the turbine according to the limit supercharging pressure so as to limit the rotation speed of the turbocharger to a value essentially equal to the predetermined limit speed.

DISCLOSURE OF INVENTION

It is the object of the present invention to provide a control method for a turbocharger supercharged internal combustion engine, such a control method being easy and cost-effective to implement and, specifically, being capable of ensuring that the operating field of the turbocharger remains within the useful zone in any operating condition of the internal combustion engine.

According to the present invention, there is provided a control method for a turbocharger supercharged internal combustion engine as claimed in the attached claims.

BRIEF DESCRIPTION OF THE DRAWINGS

The present invention will now be described with reference to the accompanying drawings which illustrate a non-limitative embodiment thereof, in which.

PREFERRED EMBODIMENTS OF THE INVENTION

Figure 1:
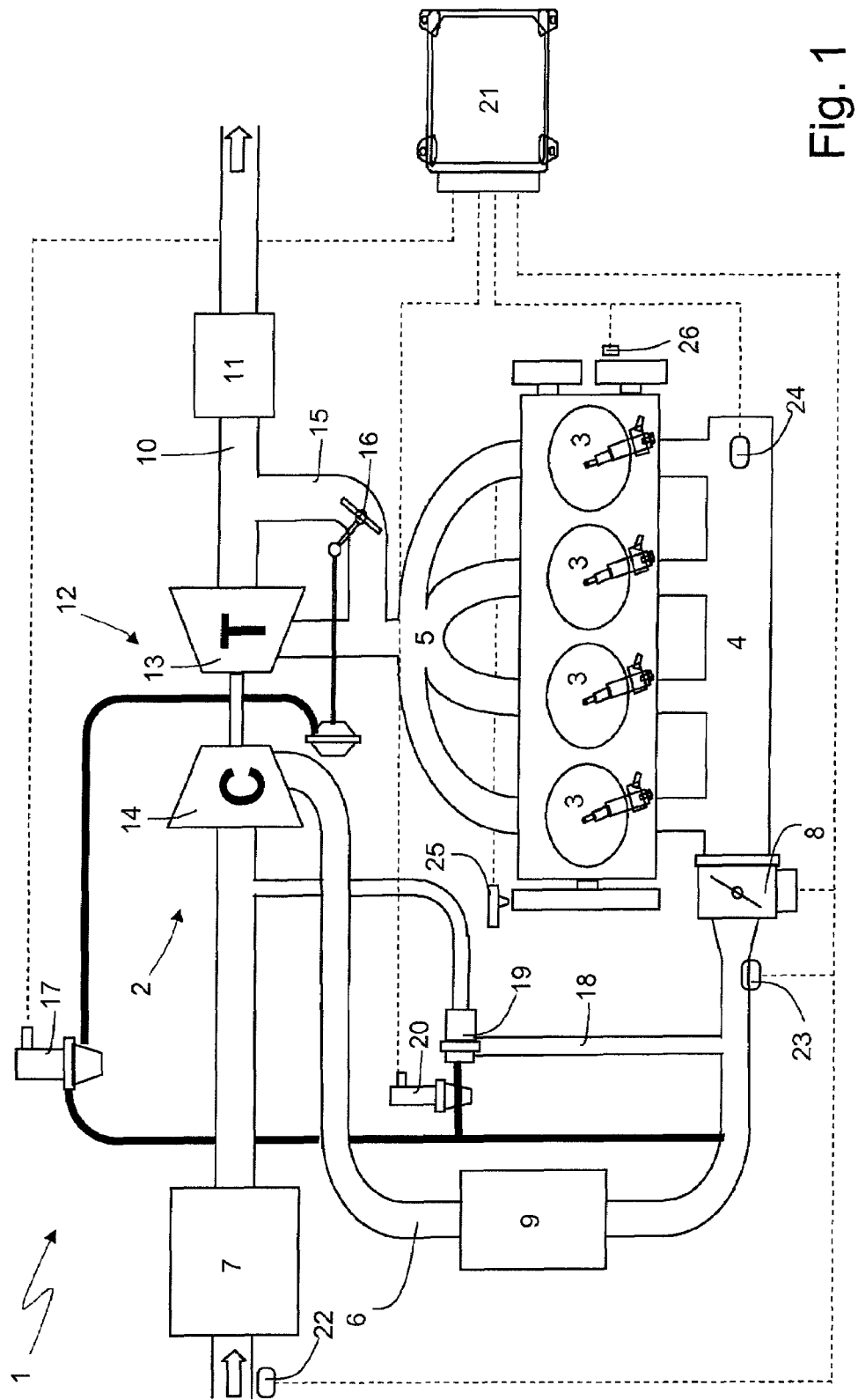
FIG. 1 diagrammatically shows a turbocharger supercharged internal combustion engine provided with an electronic control unit which implements a control method according to the present invention.

In FIG. 1, numeral 1 indicates as a whole an internal combustion engine supercharged by means of a turbocharger supercharging system 2.

The internal combustion engine 1 comprises four cylinders 3, each of which is connected to an intake manifold 4 by means of at least one corresponding intake valve (not shown) and to an exhaust manifold 5 by means of at least one corresponding exhaust valve (not shown). The intake manifold 4 receives fresh air (i.e. air from the external environment) through an intake pipe 6, which is provided with an air cleaner 7 and is regulated by a butterfly valve 8. An intercooler 9 for cooling the intake air is arranged along the intake pipe 6. To the exhaust manifold 5 there is connected an exhaust pipe 10 which feeds the exhaust gases produced by the combustion to an exhaust system, which emits the gases produced by the combustion into the atmosphere and normally comprises at least one catalyzer 11 and at least one muffler (not shown) arranged downstream of the catalyzer 11.

The supercharging system 2 of the internal combustion engine 1 comprises a turbocharger 12 provided with a turbine 13, which is arranged along the exhaust pipe 10 to rotate at a high speed under the pressure of the exhaust gases expelled from the cylinders 3, and a compressor 14, which is arranged along the intake pipe 6 and is mechanically connected to the turbine 13 to be rotably fed by the turbine 13 itself so as to increase the pressure of the air fed into the feeding pipe 6.

Along the exhaust pipe 10 there is provided a bypass pipe 15, which is connected in parallel to the turbine 13 so as to present the ends thereof connected upstream and downstream of the turbine 13 itself; along the bypass pipe 15 there is arranged a wastegate valve 16, which is adapted to adjust the flow rate of the exhaust gases which flow through the bypass pipe 15 and is driven by an actuator 17. Along the exhaust pipe 6 there is provided a bypass pipe 18, which is connected in parallel to the compressor 14 so as to present the ends thereof connected upstream and downstream of the compressor 14 itself; along the bypass pipe 18 there is arranged a Poff valve 19, which is adapted to adjust the flow rate of the exhaust gases which flow through the bypass pipe 18 and is driven by an actuator 20.

The internal combustion engine 1 is controlled by an electronic control unit 21, which governs the operation of all of the components of the internal combustion engine 1 including the supercharging system 2. Specifically, the electronic control unit 21 drives the actuators 17 and 20 of the wastegate valve 16 and of the Poff valve 19. The electronic control unit 21 is connected to sensors 22 which measure the temperature $T_o$ and the pressure $P_o$ along the intake pipe 6 upstream of the compressor 14, to sensors 23 which measure the temperature and pressure along the intake pipe 6 upstream of the butterfly valve 8, and to sensors 24 which measure the temperature and pressure inside the intake manifold 4. Furthermore, the electronic control unit 21 is connected to a sensor 25 which measures the angular position (and thus the rotation speed) of a crankshaft of the internal combustion engine 1 and to a sensor 26 which measures the timing of the intake and/or exhaust valves.

Among other matters, the electronic control unit 21 maintains the operating field of the turbocharger 12 within a useful zone. The control method used by the electronic control unit 21 to maintain the operating field of the turbocharger 12 within a useful zone is described below.

Figure 2:
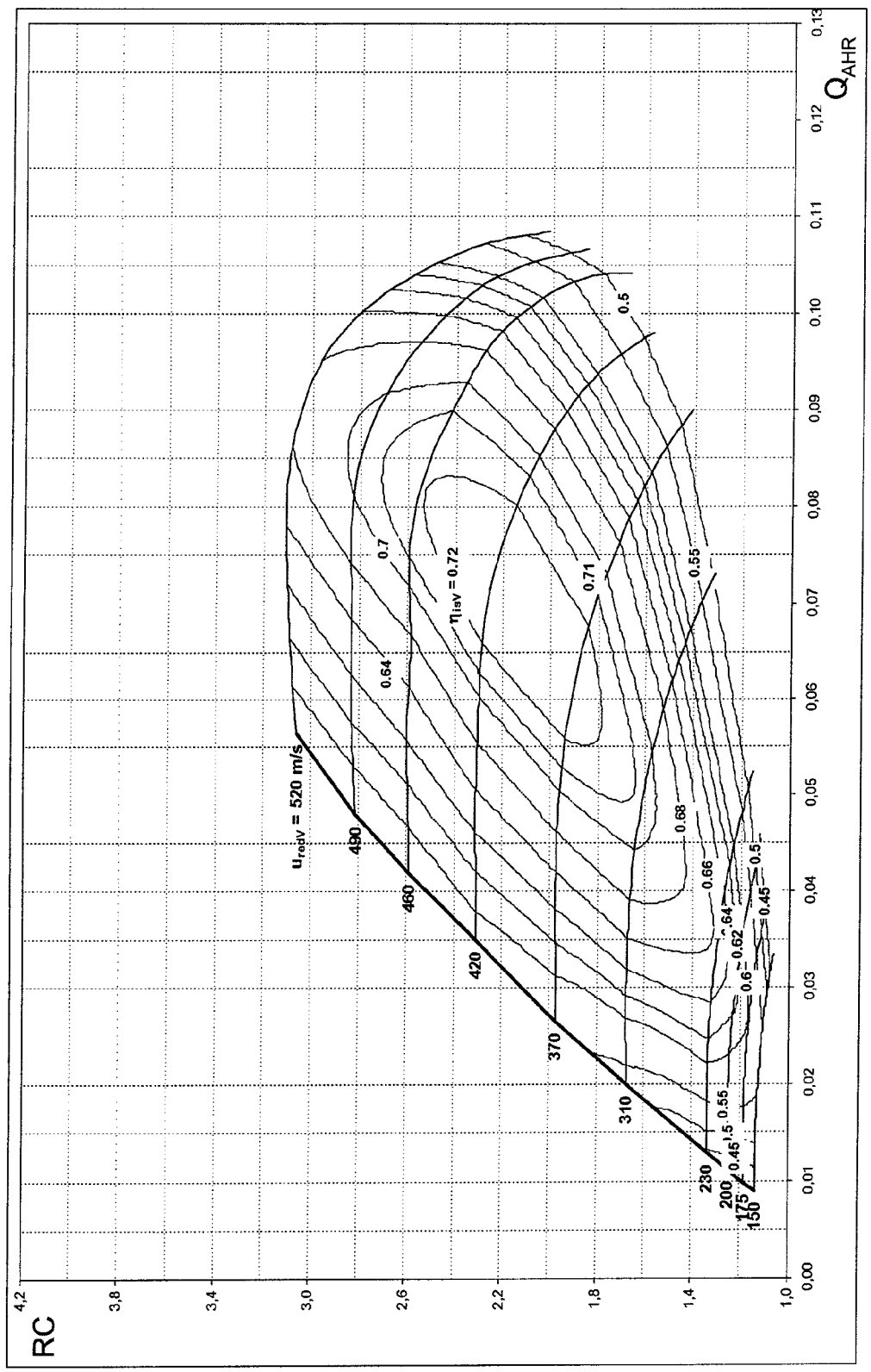
FIG. 2 shows the characteristic curves of a compressor of the turbocharger in FIG. 1 on a Reduced Mass Flow Rate/Compression Ratio map.

During a step of designing and tuning of the internal combustion engine 1, the characteristic curves of the compressor 14 (supplied by the manufacturer of the turbocharger 12) are analyzed on a Reduced Mass Flow Rate/Compression Ratio map. An example of the characteristic curves of a commercial compressor 14 (dimensioned for a gasoline engine having a total displacement of 1.4 liters) is shown in FIG. 2; the characteristic curves shown in FIG. 2 are normalized at an absolute reference temperature $T_{orif}$ and at an absolute reference pressure $P_{orif}$. On the left side of the Reduced Mass Flow Rate/Compression Ratio map there is a first "forbidden" zone delimited by the surge line, constituted by the set of points in which the aerodynamic equilibrium inside the compressor 14 is interrupted and a periodic, noisy and violent rejection of the flow rate to the mouth occurs, with effects which may be destructive for the blading; instead, on the right side of the Reduced Mass Flow Rate/Compression Ratio map there is a second "forbidden" zone delimited by the so-called "stalling line", which corresponds to the reaching of chocking conditions (and consequent flow rate stoppage) at the inlet of the turbine 13 and defines the maximum possible flow rate that the compressor 14 may supply in the given intake environment conditions.

Figure 3:
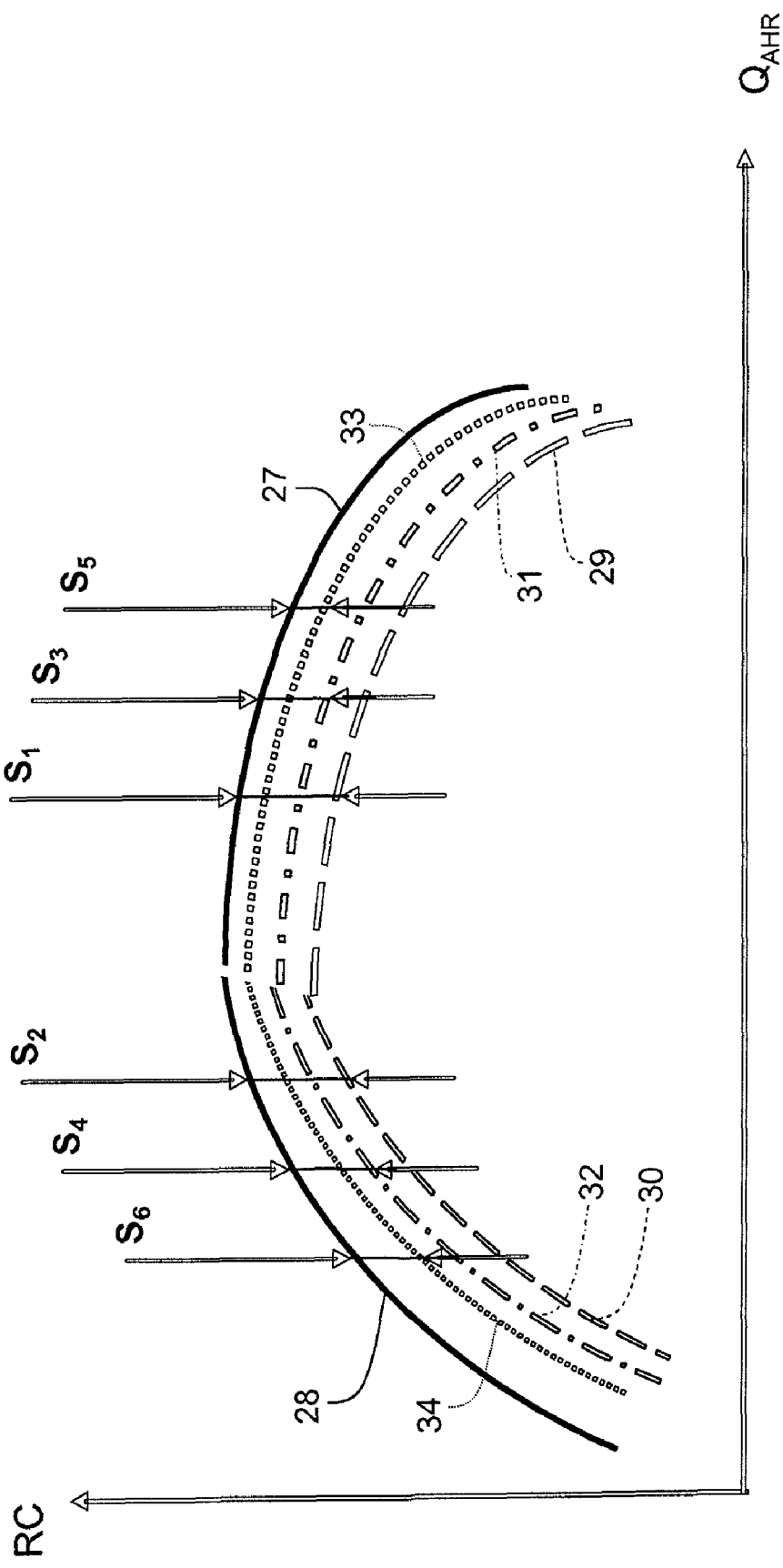
FIG. 3 shows a Reduced Mass Flow Rate/Compression Ratio map which shows the operating limit curves and the intervention curves used in the control method implemented by the electronic control unit in FIG. 1.

As shown in FIG. 3 l a curve 27 which limits the rotation speed of the turbocharger 12 and a curve 28 which delimits the surge of the turbocharger 12 are determined by analyzing the characteristic curves of the compressor 14. Two operating limit curves 29 and 30 are established according to the curves 27 and 28 and they used for limiting the pressure target downstream of the compressor 14 used by the engine control. In order to determine the operating limit curve 29 there is determined a (constant or variable) threshold $S_1$ which establishes the distance between the operating limit curve 29 and the curve 27 which limits the rotation speed of the turbocharger 12; similarly, in order to determine the operating limit curve 30 there is determined a (constant or variable) threshold $S_2$ which establishes the distance between the operating limit curve 30 and the curve 28 which delimits the surge of the turbocharger 12.

Furthermore, according to the curves 27 and 28 there are established two intervention curves 31 and 32 of the wastegate valve 16 which adjusts the bypass pipe 15 of the turbine 13 and two intervention curves 33 and 34 of the Poff valve 19 which adjusts the bypass pipe 18 of the compressor 14. In order to determine the intervention curve 31 of the wastegate valve 16 there is determined a (constant or variable) threshold $S_3$ which establishes the distance between the operating limit curve 29 and the intervention curve 31 of the wastegate valve 16; similarly, in order to determine the intervention curve 32 of the wastegate valve 16 there is determined a (constant or variable) threshold $S_4$ which establishes the distance between the intervention curve 32 of the wastegate valve 16 and the curve 28 which delimits the surge of the turbocharger 12. In order to determine the intervention curve 33 of the Poff valve 19 there is determined a (constant or variable) threshold $S_5$ which establishes the distance between the operating limit curve 29 and the intervention curve 33 of the Poff valve 19; similarly, in order to determine the intervention curve 34 of the Poff valve 19 there is determined a (constant or variable) threshold $S_6$ which establishes the distance between the intervention curve 34 of the Poff valve 19 and the curve 28 which delimits the surge of the turbocharger 12.

As previously mentioned, the thresholds $S_1$-$S_6$ may either take a constant value or may each vary according to a series of parameters associated to the air taken in by the compressor 14, such as, for example, the absolute temperature $T_o$ upstream of the compressor 14 (i.e. essentially the ambient temperature), the absolute pressure $P_o$ upstream of the compressor 14 (i.e. essentially the ambient pressure), the mass flow rate $Q_{AH}$; furthermore, the thresholds $S_1$-$S_6$ may also vary according to one or more operative parameters of the internal combustion engine 1 such as for example the pressure of the air inside the intake manifold 4, the temperature of the lubricating oil of the internal combustion engine 1, the temperature of the lubrication oil of the turbocharger 12, the temperature of the cooling fluid of the internal combustion engine 1, the engine rate.

It is important to observe that the two intervention curves 31 and 32 of the wastegate valve 16 are more internal than the two intervention curves 33 and 34 of the Poff valve 19 (i.e. the thresholds $S_3$ and $S_4$ are higher than the threshold $S_5$ and $S_6$), because if the curves 27 and 28 are exceeded preferably only the wastegate valve 16 is opened to limit the turbocharger 12 and only if the opening of the wastegate valve 16 is not sufficient then the Poff valve 19 is also opened.

During the operation of the internal combustion engine 1, the electronic control unit 21 uses the operating limit curves 29 and 30 to limit the pressure target downstream of the compressor 14 used by the engine control. In other words, the engine control implemented in the electronic control unit 21 determines, in known manner and according to the crank position, a pressure target downstream of the compressor 14 which represents a required, optimal value of the pressure downstream of the compressor 14; if the pressure target downstream of the compressor 14 is compatible with the operating limit curves 29 and 30, then the pressure target downstream of the compressor 14 is maintained, otherwise, if the pressure target downstream of the compressor 14 is not compatible with the operating limit curves 29 and 30, then the pressure target downstream of the compressor 14 is limited to the maximum value compatible with the operating limit curves 29 and 30.

Specifically, the current reduced mass flow rate $Q_{AH}$ of the compressor 14 is determined in order to limit the pressure target downstream of the compressor 14; according to the current reduced mass flow rate $Q_{AH}$ of the compressor 14 there is determined the maximum possible compression ratio RC using the operating limit curves 29 and 30, there is determined the maximum possible pressure downstream of the compressor 14 by multiplying the absolute pressure $P_o$ upstream of the compressor 14 by the maximum possible compression ratio RC, and the pressure target downstream of the compressor 14 is limited to the maximum possible pressure downstream of the compressor 14 if the pressure target downstream of the compressor 14 is higher than the maximum possible pressure downstream of the compressor 14.

The reduced mass flow rate $Q_{AHR}$ of the compressor 14 is determined by using the following equation:

$$Q_{AHR} = Q_{AH} \cdot \sqrt{\frac{T_o}{T_{orif}}} \cdot \frac{P_o}{P_{orif}}$$

$Q_{AH}$ mass flow rate of the compressor 14;
$Q_{AHR}$ reduced mass flow rate of the compressor 14;
$T_o$ absolute temperature upstream of the compressor 14;
$P_o$ absolute pressure upstream of the compressor 14;
$T_{orif}$ absolute reference temperature;
$P_{orif}$ absolute reference pressure.

The absolute reference temperature $T_{orif}$ and the absolute reference pressure $P_{orif}$ are the conditions in which the characteristic curves of the compressor 14 and thus the curves 27-34 were obtained and are design data known beforehand. The absolute temperature $T_o$ upstream of the compressor 14 and the absolute pressure $P_o$ upstream of the compressor 14 are measured by the sensors 22. The mass flow rate $Q_{AH}$ of the compressor 14 may be measured by means of a specific flow rate sensor or may be estimated in a known manner by the electronic control unit 21.

According to a different embodiment (not shown) the measurement of the absolute temperature $T_o$ upstream of the compressor 14 (i.e. essentially the ambient temperature) could not be included; in this case, the reduced mass flow rate $Q_{AHR}$ may be "partially" normalized on the basis of the $P_o/P_{orif}$ pressure ratio without accounting for the ratio between the temperatures $T_o$ and $T_{orif}$.

During the operation of the internal combustion engine 1, the electronic control unit 21 uses the intervention curves 31 and 32 of the wastegate valve 16 to control, if required, the opening of the wastegate valve 16 independently from the engine control target (i.e. independently from the engine control requests for reaching the targets of the engine control itself). Specifically, the engine control unit 21 determines (as described above) the current reduced flow rate $Q_{AHR}$ of the compressor 14, determines the current compression ratio RC of the compressor 14 (by means of a simple ratio between the pressure downstream of the compressor 14 measured by the sensors 23 and the pressure upstream of the compressor 14 measured by the sensors 22) and controls the opening of the wastegate valve 16 independently from the engine control target if on the Reduced Mass Flow Rate/Compression Ratio map the point defined by the reduced mass flow rate $Q_{AHR}$ and by the current compression ratio RC is external to the intervention curves 31 and 32 of the wastegate valve 16 (i.e. if the current compression ratio RC is higher than the compression ratio RC belonging to the intervention curves 31 and 32 corresponding to the current reduced mass flow rate $Q_{AHR}$).

Similarly, during the operation of the internal combustion engine 1, the electronic control unit 21 uses the intervention curves 33 and 34 of the Poff valve 19 to control, if required, the opening of the Poff valve 19 independently from the engine control target (i.e. independently from the engine control requests to reach the targets of the engine control itself). Specifically, the engine control unit 21 determines (as described above) the current reduced flow rate $Q_{AHR}$ of the compressor 14, determines the current compression ratio RC of the compressor 14 (by means of a simple ratio between the pressure downstream of the compressor 14 measured by the sensors 23 and the pressure upstream of the compressor 14 measured by the sensors 22) and controls the opening of the Poff valve 19 independently from the engine control target if on the Reduced Mass Flow Rate/Compression Ratio map the point defined by the reduced mass flow rate $Q_{AHR}$ and by the current compression ratio RC is external to the intervention curves 33 and 34 of the Poff valve 19 (i.e. if the current compression ratio RC is higher than the compression ratio RC belonging to the intervention curves 33 and 34 corresponding to the current reduced mass flow rate $Q_{AHR}$).

It is important to stress that the curves 28, 30, 32 and 34 are independent from the reduced limit speed $N_{tCR}$ of the turbocharger 12, whereas the curves 27, 29, 31 and 33 are dependent on the reduced limit speed $N_{tCR}$ of the turbocharger 12 (i.e. they vary according to the reduced limit speed $N_{tCR}$ of the turbocharger 12). In other words, for the turbocharger 12, a predetermined limit speed $N_{tc}$ of the turbocharger 12 is determined over which the turbocharger 12 is taken to a critical condition; by using the predetermined limit speed $N_{tc}$ of the turbocharger 12 the current reduced limit speed $N_{tCR}$ of the turbocharger 12 according to the absolute temperature $T_o$ upstream of the compressor 14 is calculated by using the following equation:

$$N_{tcR} = N_{tc} \cdot \sqrt{\frac{T_{orif}}{T_o}}$$

$N_{tc}$ limit speed of the turbocharger 12;
$N_{tCR}$ reduced limit speed of the turbocharger 12;
$T_o$ absolute temperature upstream of the compressor 14;
$T_{orif}$ absolute reference temperature.

As the absolute temperature $T_o$ upstream of the compressor 14 varies and the predetermined limit speed $N_{tc}$ of the turbocharger 12 being equal, the current reduced limit speed $N_{tCR}$ of the turbocharger 12 varies; therefore, the electronic control unit 21 cyclically determines the current reduced limit speed $N_{tCR}$ of the turbocharger 12 according to the absolute temperature $T_o$ upstream of the compressor 14 and according to the predetermined limit speed $N_{tc}$ of the turbocharger 12 (which always remains constant) and according to the current reduced limit speed $N_{tCR}$ of the turbocharger 12 is capable of determining the curves 27, 29, 31 and 33 to be used. Alternatively, being the predetermined limit speed $N_{tc}$ of the turbocharger 12 constant to simplify the management of the curves 27, 29, 31 and 33, the curves 27, 29, 31 and 33 themselves could be stored in the electronic control unit 21 parameterized according to the absolute temperature $T_o$ upstream of the compressor 14; in this manner, the electronic control unit 21 does not need to calculate the current reduced limit speed $N_{tCR}$ of the turbocharger 12 nor subsequently select the curves 27, 29, 31 and 33 to be used, but simply needs to update the curves 27, 29, 31 and 33 according to the absolute temperature $T_o$ upstream of the compressor 14.

According to a different simplified (and thus less accurate) embodiment, the current (not reduced) mass flow rate $Q_{AH}$ or the target (reduced or not reduced) mass flow rate $Q_{AHR}$ could be used instead of using the current reduced mass flow rate $Q_{AHR}$.

The above-described control method presents many advantages, because it is simple and cost-effective to implement, it does not use a high calculating power of the electronic control unit 21 and it does not require the installation of additional electronic components (specifically sensors or actuators) with respect to those already present in a modern internal combustion engine. Furthermore, the above-described control method is particularly effective in ensuring that the operating field of the turbocharger 12 remains within the useful zone in any operating condition of the internal combustion engine 1. Such an efficiency is ensured by the opening, in case of need, of the wastegate valve 16 and, if the opening of the wastegate valve 16 is not sufficient, by the opening of the Poff valve 19; indeed, owing to the possibility of opening both valves 16 and 19, the field of operation of the turbocharger 12 is ensured within the useful zone in any operating condition of the internal combustion engine 1.

The invention claimed is:

1. A control method of an internal combustion engine (1) supercharged by means of a turbocharger (12) provided with a turbine (13) and with a compressor (14); the control method comprises the steps of:
   establishing at least one operating limit curve (29; 30) on a Reduced Mass Flow Rate/Compression Ratio map;
   establishing at least one intervention curve (31; 32) of a wastegate valve (16) which adjusts a bypass pipe (15) of the turbine (13) on a Reduced Mass Flow Rate/Compression Ratio map;
   establishing at least one intervention curve (33; 34) of a Poff valve (19) which adjusts a bypass pipe (18) of the compressor (14) on a Reduced Mass Flow Rate/Compression Ratio map;
   using the operating limit curve (29; 30) to limit the pressure target downstream of the compressor (14) used by the engine control;
   controlling the opening of the wastegate valve (16) if the intervention curve (31; 32) of the wastegate valve (16) is exceeded; and
   controlling the opening of the Poff valve (19) if the intervention curve (33; 34) of the Poff valve (19) is exceeded.

2. A method according to claim 1, comprising the further steps of:
   determining a first operating limit curve (29), a first intervention curve (31) of the wastegate valve (16), and a first intervention curve (33) of the Poff valve (19) according to a curve (27) which limits the rotation speed of the turbocharger (12); and
   determining a second operating limit curve (30), a second intervention curve (32) of the wastegate valve (16), and a second intervention curve (34) of the Poff valve (19) according to a curve (28) which limits the surge of the turbocharger (12).

3. A method according to claim 2, wherein the step of determining the first curves (29, 31, 33) contemplates the further steps of:
   determining the curve (27) which limits the rotation speed of the turbocharger (12); and
   determining for each first curve (29, 31, 33) a corresponding threshold ($S_1$, $S_3$, $S_5$) which establishes the distance between the first curve (29, 31, 33) and the curve (27) which limits the rotation speed of the turbocharger (12).

4. A method according to claim 2, wherein the step of determining the second curves (30, 32, 34) contemplates the further steps of:
   determining the curve (28) which delimits the surge of the turbocharger (12); and
   determining for each second curve (30, 32, 34) a corresponding threshold ($S_2$, $S_4$, $S_6$) which establishes the distance between the second curve (30, 32, 34) and the curve (28) which delimits the surge of the turbocharger (12).

5. A method according to claim 3, wherein the second curves (28, 30, 32, 34) are independent from a reduced limit speed ($N_{tCR}$) of the turbocharger (12).

6. A method according to claim 3, wherein the first curves (27, 29, 31, 33) are dependent on a reduced limit speed ($N_{tCR}$) of the turbocharger (12).

7. A method according to claim 6, comprising the further steps of:
   establishing a predetermined limit speed ($N_{tc}$) of the turbocharger (12);
   calculating the current reduced limit speed ($N_{tCR}$) of the turbocharger (12) using the predetermined limit speed ($N_{tc}$) of the turbocharger (12) and the absolute temperature ($T_o$) upstream of the compressor (14); and
   determining the first curves (27, 29, 31, 33) to be used according to the current reduced speed limit ($N_{tCR}$) of the turbocharger (12).

8. A method according to claim 7, wherein the current reduced speed limit ($N_{tCR}$) of the turbocharger (12) is calculated by using the following equation:

$$N_{tcR} = N_{tc} \cdot \sqrt{\frac{T_{orif}}{T_o}}$$

$N_{tc}$ limit speed of the turbocharger (12);
$N_{tCR}$ reduced limit speed of the turbocharger (12);
$T_o$ absolute temperature upstream of the compressor (14);
$T_{orif}$ absolute reference temperature.

9. A method according to claim 6, comprising the further steps of:
   parameterizing the first curves (27, 29, 31, 33) according to the absolute temperature ($T_o$) upstream of the compressor (14); and
   updating the first curves (27, 29, 31, 33) according to the absolute temperature ($T_o$) upstream of the compressor (14).

10. A method according to claim 1, wherein the step of using the operating limit curve (29; 30) for limiting the pressure target downstream of the compressor (14) used by the engine control contemplates the further steps of:
    determining the current reduced mass flow rate ($Q_{AHR}$) of the compressor (14);
    determining the current limit compression ratio (RC) of the compressor (14) according to the current reduced mass flow rate ($Q_{AHR}$) using the operating limit curve (29; 30);
    determining the current pressure upstream of the compressor (14);
    determining the maximum possible pressure downstream of the compressor (14) by multiplying the absolute pressure ($P_o$) upstream of the compressor (14) by the maximum possible compression ratio (RC); and
    limiting the pressure target downstream of the compressor (14) to the maximum pressure downstream of the compressor (14) if the pressure target downstream of the compressor (14) is higher than the maximum possible pressure downstream of the compressor (14).

11. A method according to claim 1, wherein the step of controlling the opening of the wastegate valve (16) if the intervention curve (31; 32) of the wastegate valve (16) is exceeded contemplates the further steps of:

determining the current reduced mass flow rate ($Q_{AHR}$) of the compressor (14);

determining the current compression ratio (RC) of the compressor (14); and controlling the opening of the wastegate valve (16) if the current compression ratio (RC) is higher than the compression ratio (RC) belonging to the intervention curve (31; 32) of the wastegate valve (16) at the current reduced mass flow rate ($Q_{AHR}$).

12. A method according to claim 1, wherein the step of controlling the opening of the Poff valve (19) if the intervention curve (33; 34) of the Poff valve (19) is exceeded contemplates the further steps of:

determining the current reduced mass flow rate ($Q_{AHR}$) of the compressor (14);

determining the current compression ratio (RC) of the compressor (14); and controlling the opening of the Poff valve (19) if the current compression ratio (RC) is higher than the compression ratio (RC) belonging to the intervention curve (33; 34) of the Poff valve (19) at the current reduced mass flow rate ($Q_{AHR}$).

13. A method according to claim 10, wherein the reduced mass flow rate ($Q_{AHR}$) of the compressor (14) is determined by using the following equation:

$$Q_{AHR} = Q_{AH} \cdot \sqrt{\frac{T_o}{T_{orif}}} \cdot \frac{P_o}{P_{orif}}$$

$Q_{AH}$ mass flow rate of the compressor (14);
$Q_{AHR}$ reduced mass flow rate of the compressor (14);
$T_o$ absolute temperature upstream of the compressor (14);
$P_o$ absolute pressure upstream of the compressor (14);
$T_{orif}$ absolute reference temperature;
$P_{orif}$ absolute reference pressure.

* * * * *